United States Patent

Marshall

[15] 3,647,943

[45] Mar. 7, 1972

[54] TRANSDUCER SYSTEM AND METHOD

[72] Inventor: Daniel J. Marshall, Torrance, Calif.

[73] Assignee: The Magnavox Company, Torrance, Calif.

[22] Filed: June 6, 1969

[21] Appl. No.: 831,029

[52] U.S. Cl. ....................178/5.4 ST, 178/5.2, 178/5.4 CR, 350/162 SF

[51] Int. Cl. ....................H04n 9/06

[58] Field of Search ....................178/5.4 ST, 5.4 CR, 5.2; 350/162 SF

[56] References Cited

UNITED STATES PATENTS

| | | | |
|---|---|---|---|
| 2,733,291 | 7/1952 | Kell | 178/5.4 ST |
| 2,736,763 | 2/1956 | Weimir | 178/5.4 ST |
| 3,378,633 | 12/1970 | Macouski | 178/5.4 ST |
| 3,378,634 | 12/1970 | Macouski | 178/5.4 ST |
| 3,419,672 | 12/1970 | Macouski | 178/5.4 ST |
| 3,504,606 | 4/1970 | Macouski | 178/5.4 ST |
| 3,470,310 | 9/1969 | Shashoua | 178/5.4 ST |
| 3,524,014 | 8/1970 | Watanabe | 178/5.4 ST |

*Primary Examiner*—Robert L. Richardson
*Assistant Examiner*—Richard P. Lange
*Attorney*—Smyth, Roston & Pavitt

[57] ABSTRACT

This invention relates to a system for, and method of, reproducing a color image from a composite black-and-white image. The composite black-and-white image is formed either on an exposure or is formed from a live image. In either case, modulations are provided in a first particular line pattern to obtain a representation of a first particular color. Modulations are also provided in a second particular line pattern different from the first particular line pattern to obtain a representation of a second particular color. The third color may be unmodulated. The three colors add optically to form the image luminance.

To reproduce the color image, signals are provided by scanning the composite image. Means are provided for operating upon such signals in accordance with the modulations in the first particular line pattern to produce signals representing the first particular color. Means are also provided for operating upon the signals representing the composite image in accordance with the modulations in the second particular line pattern to produce signals representing the second particular color. The signals representing the first and second particular colors are then used in conjunction with the luminance to reproduce the color image.

18 Claims, 11 Drawing Figures

Patented March 7 1972 3,647,943

3 Sheets-Sheet 1

INVENTOR

Daniel J. Marshall

By Smyth, Roston & Pavitt

ATTORNEYS

Patented March 7 1972 3,647,943

3 Sheets-Sheet 2

INVENTOR

Daniel J. Marshall

By Smyth, Roston & Pavitt

ATTORNEYS

INVENTOR

Daniel J. Marshall

By Smyth, Roston & Pavitt

ATTORNEYS

TRANSDUCER SYSTEM AND METHOD

This invention relates to a system for, and method of, reproducing a color image from a composite black-and-white image. The invention is particularly adapted to be used in recording the color image on a monochrome medium and in reproducing the color image from the monochrome medium.

Various attempts have been made to convert a color image into black-and-white representations and to reproduce the color image from the black-and-white representations. These attempts have been made because black-and-white representations are not as expensive as color representations. For example, black-and-white representations are approximately one-third the cost of color representations. Furthermore, color video cameras are quite expensive and complex. Generally the color video cameras constitute a plurality of camera tubes in a single complex package. Because of this, it would be desirable to provide a simplified video camera which would provide color information from a single camera tube.

This invention provides a system for, and method of, recording color information on a black-and-white film and for subsequently reproducing the color information from the black-and-white film. The system constituting the invention records a first color such as blue on the film while modulating the color in a first particular line pattern. The system further records a second color such as red on the film while modulating the color in a second particular line pattern having a different orientation from the first particular line pattern. The system also records a third color such as green on the film without any modulations. The three recordings add optically to form a composite black-and-white image on the film. Any one of the three primary colors can be the unmodulated color.

To reproduce the color information from the black-and-white film, signals are produced to represent the composite by scanning the black-and-white image on the film. The signals representing the composite image are processed to produce the signals representing the luminance in the color image. The signals representing the composite image are also processed to recover the signals representing the first color, such as blue, in accordance with the modulations in the first line pattern. The signals are further processed to recover the signals representing the second color, such as red, in accordance with the modulations in the second line pattern. The signals representing the first and second line patterns in conjunction with the luminance signal are then processed to reproduce the signals representing the third color, such as green. The signals representing the luminance of the color image and the signals representing the first, second and third colors are combined to obtain a reproduction of the color image.

The line patterns produced on the composite image may have different relationships within the concept of the invention. In both embodiments, the lines in the second pattern have a different angular or directional orientation from the lines in the first pattern. In one embodiment, the lines in the first pattern cause modulations at a first frequency to be produced and the lines in the second pattern cause modulations to be produced at a second frequency different from the first frequency. The different frequencies are detected in the reproducing system to separate the signals representing the first color from the signals representing the second color.

In another embodiment, scanning of the lines in the first pattern cause signals to be produced at the same frequency as scanning of the lines in the second pattern. However, the signals produced by the lines in the first pattern have a first phase relationship in pairs of successive horizontal scan lines on the composite image. For example, these signals may be substantially in phase in pairs of successive horizontal scan lines on the composite image. The signals produced by the scan lines in the second pattern have a second phase relationship substantially 180° out of phase in successive horizontal scan lines on the composite image relative to the first phase relationship. When the signals in the successive scan lines are processed, the signals in one line are added to the signals in the adjacent line to recover the signals representing the first color. Similarly, the signals in one line are subtracted from the signals in the adjacent line to recover the signals representing the second color. The signals representing the first and second colors are then processed in a manner similar to that described above to obtain a reproduction of the color image.

The description above has proceeded on the basis of the production of a composite image on black-and-white film. It will be appreciated that the systems and methods constituting this invention may also be used with a color camera to produce signals representing a composite image so that the signals may be transmitted, as in a closed circuit, to a color television receiver. When an image is viewed live by a camera, filters are provided in the camera to provide line patterns similar to those described above. For example, filter lines in a first pattern may subtract blue from the color and filter lines in a second pattern may subtract red from the color.

Figure 1:
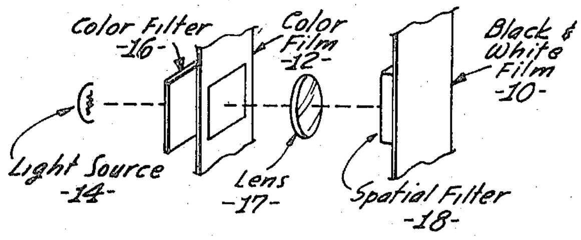
FIG. 1 is a schematic diagram of a system constituting this invention for converting a color image to a composite image on a black-and-white film.

In one embodiment of the invention, a composite image is produced on a black-and-white film generally indicated at 10 in FIG. 1 from a color film generally indicated at 12. The image may be formed by shining light from a source 14 through a color filter 16 and the film 12 to the black-and-white film 10. A filter 18 is disposed between the color film 12 and the black-and-white film 10. A lens 17 may also be provided for focusing the image from the color film 12 on the black-and-white film 10.

The black-and-white film 10 is exposed several different times to receive the image representing different colors. For example, a first exposure may be provided when the spatial filter 18 modulates the light passed by a blue filter 16. A second exposure may be provided when the spatial filter 18 modulates the light passed by a red color filter 16. Similarly, a third exposure may be provided when the color filter 16 has characteristics to pass only green light.

It is desirable to balance the exposures made by the three color components to produce an overall luminance which is represented by the equation indicated below. This approximates the luminance response of the human eye. This equation is accepted as follows as a standard in the television field:

$Y=0.587G+0.299R+0.114B$, where $Y$ = White light $G$ = Green component $R$ = Red component
$B$ = Blue component Because of this, the exposure of the black-and-white film to the green component of light from the image 12 may occur approximately five times greater than the exposure to the blue component of light from the image 12 and approximately three times greater than the exposure to the red component of light from the image 12. This is on the assumption that the film has a substantially flat spectral response. Adjustments can be made to accommodate for any changes in the response of the film from a spectrally flat spectral response. Ideally, the exposure process should be linear in transmissivity versus exposure.

Figure 2:
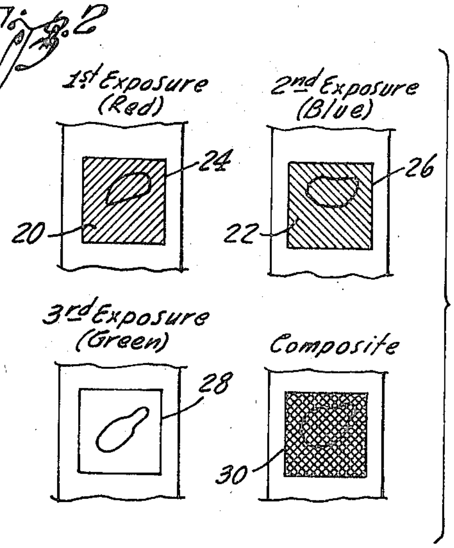
FIG. 2 is a schematic representation of each of a plurality of images superimposed on the black-and-white film in the embodiment shown in FIG. 1 to form the composite image.
Figure 3:
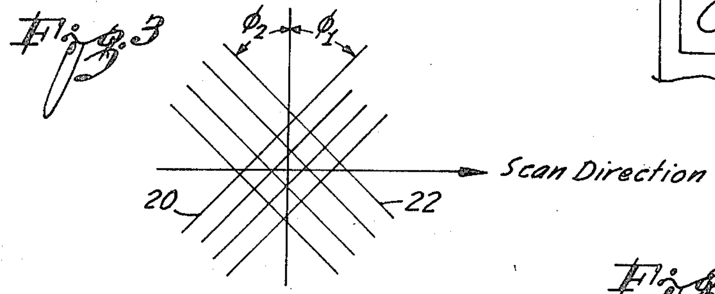
FIG. 3 is an enlarged schematic representation of gratings used in the embodiment shown in FIGS. 1 and 2 to produce the individual images shown in FIG. 2.

The filter 18 is provided with special characteristics when an exposure is being made of the red and blue components in the color film 12. For example, when an exposure is being made to obtain the red components in the color film 12, the spatial filter 18 is provided with a grating comprising a plurality of parallel, equally spaced lines 20 as illustrated in FIG. 2. The lines are disposed in a first direction which is transverse to the direction in which a beam sweeps normally in a television tube. For example, when the beam sweeps horizontally, the lines 20 may have any desired direction other than the horizontal direction. The lines 20 are preferably disposed in a direction to produce signals modulated at a particular frequency such as approximately 3 megacycles per second. This is accomplished by the following formula which is obtained from the enlarged representation shown in FIG. 3:

$f_1 = Kf_{s1}(\cos\phi)$, where $f_1$ = the frequency of modulation such as approximately 3 megacycles per second;

$f_{s1}$ = the spatial frequency in cycles per inch of the modulations representing the red color;

$K$ = a constant (scan rate in inches/second); and $\phi_1$ = the angle between the lines 20 and the line normal to the scanning direction of the beam, as shown in FIG. 3.

When an exposure is being made to obtain the blue components in the color film 12, the spatial filter 18 is provided with a grating comprising a plurality of parallel, equally spaced lines 22 as indicated in FIG. 2. The lines 22 are disposed in a direction transverse to the lines 20 and also transverse to the scanning direction. The lines are disposed in an angular direction so that the modulation frequency will be different from that provided by the lines 20. For example, when the lines 20 provide a modulation frequency of approximately 3 megacycles per second, the lines 22 provide a modulation frequency of approximately 2 megacycles per second. The frequency of 2 megacycles per second may also be obtained in part by separating the lines 22 by a greater distance than the lines 20. The line width should always be equal to one-half the spacing between the lines. Actually a sinusoidal grating is preferred.

The production of signals modulated to a particular frequency such as approximately 2 megacycles per second may be seen from the following equation:

$f_2 = Kf_{s2}(\cos\phi_2)$, where $f_{s2}$ = the spatial frequency in cycles per inch of the modulations representing the blue color;

$f_2$ = the frequency of modulation such as approximately 2 megacycles per second; and $\phi_2$ = the angle between the lines 22 and the line normal to the scanning direction of the beam, as shown in FIG. 3.

$K$ = scan velocity (inches/sec)

The formation of the composite image on the black-and-white film 10 is illustrated schematically in FIG. 2. The first exposure is made through a red filter and the lines 20 are provided on the spatial filter 18 to modulate the exposure so that a resultant image 24 is formed. The second exposure is made through a blue filter and the lines 22 are provided on the spatial filter to modulate the exposure so that a resultant image 26 is formed. The lines 22 are provided with a different angular or directional orientation from the lines 20. The third exposure is made through a green filter without any modulation so that a resultant image 28 is formed. Since the first, second and third exposures are made on the same film, a composite image 30 is produced on the film.

Figure 4:
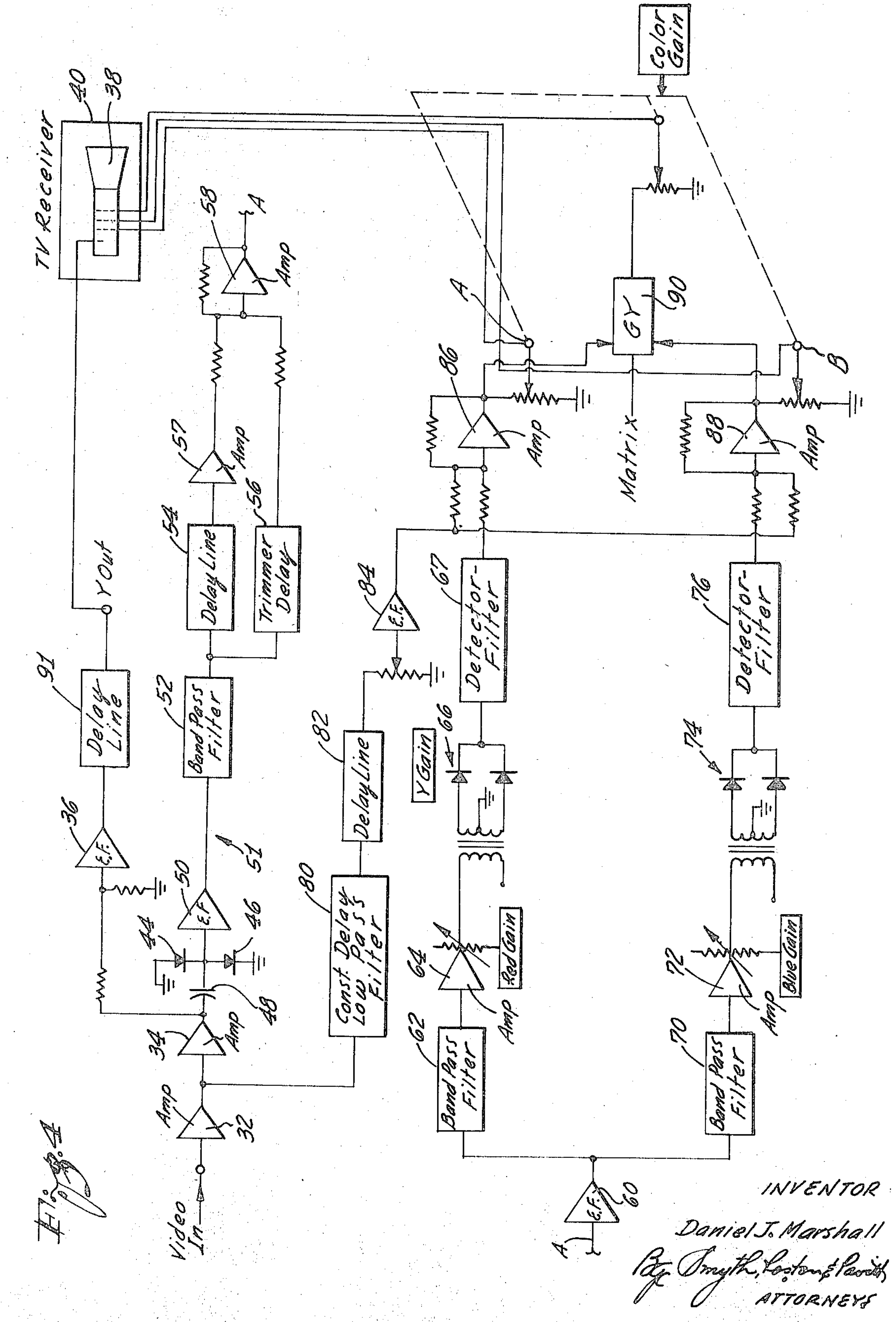
FIG. 4 is a diagram of the electrical circuitry which may be used to reproduce the color image from the composite image shown in FIG. 2.

The composite image 30 is processed by the circuitry shown in FIG. 4 to reproduce the color image on the film 12. The composite image is scanned by a flying spot scanner or image tube in a well-known manner to produce at each instant signals having characteristics representing the composite image 30. The signals are amplified as at 32 and 34 and are isolated by an emitter follower 36 to produce signals which represent the luminance of the color image in the film 12. These signals are applied to the cathode of a cathode-ray tube 38 in a conventional television receiver 40 in a manner similar to the normal introduction of the luminance signals in a television receiver.

The signals from the amplifier 34 are also passed through an intensity transcient limiter clipper formed from a pair of diodes 44 and 46. The cathode of the diode 44 and the anode of the diode 46 are connected to receive the signals passing from the amplifier 34 through a capacitor 48 and the anode of the diode 44 and the cathode of the diode 46 are grounded. The diodes 44 and 46 limit the amplitude of large-luminance transcients of the signal from the amplifier 34 to an amplitude equal to the maximum amplitude of the color modulations; this is done to minimize spurious colors caused by luminance information getting into the chrominance channel 51. The signals from the clipper are introduced to an emitter-follower 50 and are then band-passed by a filter 52 having a band pass between 1.5 and 3.5 megacycles per second. This band pass is designed to pass the signal components representing the color and the modulations produced by the line patterns 20 and 22 in FIG. 2.

The signals are then applied to a delay line 54 providing a delay of one horizontal line and through a delay line 56 providing an adjustable delay to insure that the difference in the delays between the lines 54 and 56 corresponds to the time required to sweep through one horizontal line. The signal from the delay line 54 is amplified and inverted by an amplifier 57 to compensate for the attenuation of the delay line and provide the proper phase to sum the two signals from the delay lines 54 and 56 such that vertical scene modulation is cancelled. The signals from the delay lines 54 and 56 are increased in amplitude by amplifier 58.

The outputs of the relatively undelayed signal from the delay line 56 and the delayed signal from the delay line 54 are averaged for an important reason. For example, unless an average of two successive lines is provided, a picket fence in the color image may interfere with the modulations at 2 megacycles or at 3 megacycles or may produce undesired modulations at these frequencies. By averaging the signals in two successive horizontal lines, the phase of the signals representing the picket fence in two successive horizontal lines will not correspond to the phase of the modulations produced by the lines 20 or 22 in two successive horizontal lines. This prevents the picket fence from affecting the modulations of the red color as represented by the lines 20 or the modulations of the blue color as represented by the lines 22. Ideally the spatial frequency of each of the carriers should be selected such that the modulations produced in successive scan lines should alternate 180° in phase with respect to a reference perpendicular to the scan direction.

It will be appreciated that successive pairs of horizontal lines may be simultaneously scanned and averaged to minimize any effects of the system constituting this invention on such visual items as picket fences. When successive pairs of lines are scanned, the delay line 54 may be eliminated. After each scan of a pair of lines, an advance of a single line is made in each scanner so that the first scanner scans a new line and the second scanner scans the line previously scanned by the first scanner.

The signals from the amplifier 58 are buffered by emitter-follower 60. The signals from the emitter-follower 60 are in turn band-passed by filter 62 which is constructed to pass signals at approximately 3 megacycles corresponding to the modulations provided for the red color. This causes only the signals representing the color red in the color image on the color film 12 to pass through the filter 62. These signals are further increased in amplitude by an amplifier 64 having an adjustable gain and are then detected in a full-wave rectifier-detector 66. The ripple is then removed by the detector filter 67.

In like manner, the signals from the amplifier 60 are band-passed by a filter 70 having band-pass characteristics at 2 megacycles to pass only the signals representing the color blue in the color image on the color film 12. These signals are then increased in amplitude by an amplifier 72 having an adjustable gain and are then detected in a full-wave rectifier-detector 74. The ripple is then removed by the detector filter 76.

The signals from the amplifier 32 are rolled off by a low-pass filter 80 which operates to provide a signal representing the intensity or luminance of the image at each position on the color film 12 as the position is scanned. In other words, the filter 80 provides a signal representing the component generally designated as −Y in television engineering. The signals passing through the filter 80 are delayed by a suitable period of time such as 800 microseconds corresponding to the delay which is provided in the channel including the filters 62 and 67 and which is provided in the channel including the filters 70 and 76. The signals from the filter 82 are isolated by an emitter-follower 84.

The signals representing −Y from the emitter-follower 84 are added to the signals from the detector filter 67 and are increased in amplitude by an amplifier 86. The signals are added in the proper amplitude proportions so that $R-Y \equiv 0$ for a white image on the color film 12, where $R$ corresponds to the signal produced by the amplifier 86 to represent the red component. Similarly, the signals representing −Y from the emitter-follower are added with the signals representing the color blue (B) from the detector filter 76 and are increased in amplitude by an amplifier 88. The signals are added in the proper amplitude proportions so that $B-Y \equiv 0$ for a white image on the color film 12.

The signals from the amplifiers 86 and 88 are combined in a proper matrix arrangement 90 to form the signals $G-Y$. The matrix arrangement 90 is well known and is included in television receivers now being marketed on a commercial basis. The matrix arrangement 90 is shown as a separate stage in FIG. 4 for purposes of convenience. The signals from the amplifiers 86 and 88 and from the matrix arrangement 90 are then applied to the three grids of the cathode-ray tube in the television receiver 40. The cathode of the tube in the television receiver has signals applied to it through a delay line 91 which delays the signals from the emitter-follower 36 for a period of time corresponding to the delays provided by the filter 52, the delay line 54 and the amplifiers 57. The signals from the emitter-follower 36 represent the intensity of the signal. The television receiver operates in a well-known manner on the signals applied to the cathode and the grids of the cathode-ray tube in the receiver to reproduce the color image on the face of the television receiver.

Since the modulating frequencies of 2 megacycles and 3 megacycles occur within the broadcast television video frequency spectrum, there is a tendency for the lines 20 and 22 to appear faintly on the color image that is reproduced. The modulating frequency of 2 megacycles has a greater tendency to produce a grating than the modulating frequency of 3 megacycles since the video response is considerably lower at 3 megacycles than at 2 megacycles. Because of this, the color blue is shown for the modulating frequency of 2 megacycles since it produces only approximately 10 percent of the total luminance. Higher frequencies could be utilized to reduce luminance to chrominance crosstalk and grating visibility.

Figure 5:
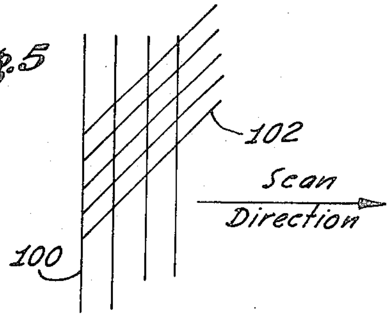
FIG. 5 is an enlarged schematic representation of gratings used in a second embodiment to produce individual images representing different colors.

A second embodiment of the invention is illustrated in FIG. 5. In this embodiment, lines 100 in a first pattern have a different directional or angular orientation from lines 102 in a second pattern. However, the distance in the direction of scan for the lines 100 in the first pattern correspond to the distance in the direction of scan for the lines in the second pattern 102. For example, the lines 100 may be disposed in a vertical direction and the lines 102 may be disposed at an angle transverse to the vertical. Although the lines 100 are equidistant to the lines 102 in the direction of scan, the distance in a direction normal to the lines 100 is different from the distance in a direction normal to the lines 102.

Since the lines 100 are equidistant to the lines 102 in the direction of scan, the modulating frequency produced by the lines 100 is equal to the modulating frequency produced by the lines 102. For example, the lines 100 may produce modulating signals for the color blue and the lines 102 may produce modulating signals for the color red. As will be described subsequently, the modulating signals for the color blue may have a first phase relationship in successive lines of sweep and the modulating signals for the color red may have a second phase relationship in successive lines of sweep. For example, the modulating signals for the color blue may have a first phase relationship in successive lines of sweep and the modulating signals for the color red may have a second phase relationship substantially 180° out of phase in successive lines of sweep relative to the first phase relationship. Specifically, the modulating signals for the color blue may be in phase in successive lines of sweep and the modulating signals for the color red may be substantially 180° out of phase in the successive lines of sweep with respect to a vertical reference.

Figure 6:
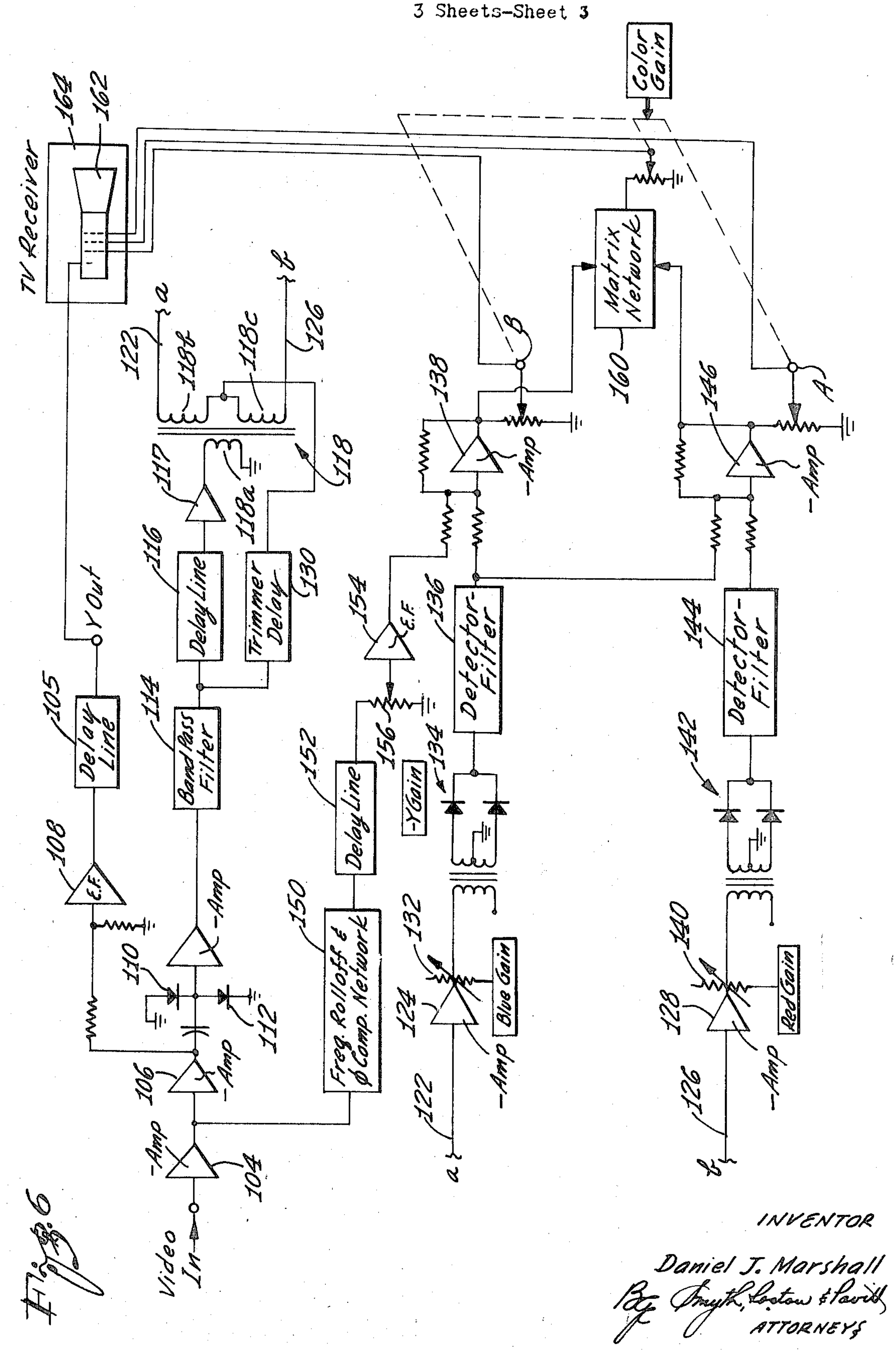
FIG. 6 is a diagram of the electrical circuitry which may be used to reproduce the color image from the composite image produced by the gratings shown in FIG. 5.

A system for demodulating the signals produced by the lines 100 and 102 and for reproducing the color image is illustrated in FIG. 6. This system includes amplifiers 104 and 106 and an emitter-follower 108 similar to those shown in FIG. 4. The emitter-follower 108 produces a signal representing the intensity or luminance of the image at each instant.

The signals from the amplifier 106 are also limited by a clipper circuit including diodes 110 and 112. The clipper circuit operates in a similar manner to the corresponding clipper circuit in FIG. 4. The signals from the clipper circuit are band-passed by a filter 114 constructed to pass signals in a suitable frequency range such as approximately 3 megacycles. A similar band-pass filter is included in the embodiment shown in FIG. 4.

The signals passing through the filter 114 are delayed for a period of time corresponding to that required for the scan beam to move from one point to the point on the next horizontal scan that is on a line which is orthogonal to the scan direction and which connects the two points. The signals are then amplified and inverted by an amplifier 117 to compensate for the attenuation of the delay line 116 and provide the proper phase to operate upon the signals from the delay line 116 and a trimmer delay 130. The signals from the amplifier 117 are then introduced to one terminal of a primary winding **118*a* of a transformer generally indicated at 118, the other terminal of the primary winding being grounded. The transformer also has a pair of secondary windings 118*b* and 118*c*. One terminal of the secondary winding 118*b* is connected through a line 122 to an amplifier 124 and one terminal of the secondary winding 118*c* is connected through a line 126 to an amplifier 128. The other terminals of the windings 118*b* and 118*c* have a common connection which constitutes a center tap for the resultant winding formed by the windings 118*b* and 118*c***.

In addition to driving the delay line 116, the signals from the filter 114 are also delayed by a trimmer delay 130. The trimmer delay 130 is provided with characteristics so that the difference in delay between the delay line 116 and the trimmer delay 130 corresponds to the time required to the sweep through one horizontal line. The signals from the trimmer delay 130 are connected to the common center tap connection between the secondary windings **118*b* and 118*c***.

The signals from the delay lines 116 and 130 are added in the line 122. Since the modulations provided by the lines 100 are in phase in successive horizontal lines, this causes the signals representing the color blue to be introduced to the amplifier 124. The gain of the signals representing the color blue are adjustable to provide a proper relationship between the intensity of the color blue and the intensity of the colors red and green. This is indicated by an adjustable potentiometer 132. The signals from the amplifier 124 are then detected by a full-wave rectifier-detector 134 corresponding to similar rectifier-detectors in FIG. 4 and are subsequently smoothed by the detector filter 136 also corresponding to similar detector filters in FIG. 4. The detected signal passes to the color difference amplifier 138.

In like manner, the signals from the delay lines 116 and 130 are subtracted in the line 126. Since the modulations provided by the lines 102 are out of phase in successive horizontal lines, this causes the signals representing the color red to be increased in amplitude by an amplifier 128. The gain of the signals representing the color red are adjustable to provide a proper relationship between the intensity of the color red and the intensity of the colors blue and green. This is indicated by an adjustable potentiometer 140. The signals from the amplifier 128 are then detected by a full-wave rectifier-detector 142 corresponding to the rectifier-detector 134. The signals are subsequently smoothed by a detector filter 144 corresponding to the filter 136. The detected signal then passes to the color difference amplifier 146.

The luminance signal is inverted by the amplifier 104 and delayed by the constant delay low-pass filter 150 corresponding to the filter 80 in FIG. 4. The filter 150 limits the bandwidth of the intensity or luminance signal (−Y) to equal the bandwidth (risetime) of the two demodulated color signals; the bandwidth of the two demodulated colors is limited by the detector filters. The signals are then introduced to a delay line 152 corresponding to the delay line 82 in FIG. 4. This delay line provides a delay corresponding to that provided in the chrominance channels discussed in the previous two paragraphs. The signals are then buffered by an emitter-follower 154 through a potentiometer 156 to adjust the gain for a proper value of −Y.

The signals from the emitter-follower 154 are added to the signals from the detector filter 136 and are amplified by the color difference amplifier 138 to produce signals representing the $B-Y$ component. Similarly, the signals from the emitter-follower 154 are added to the signals from the filter detector 144 and are amplified by the color difference amplifier 146 to produce signals representing the $R-Y$ component. The signals representing the $R-Y$ and $B-Y$ components are added in the proper relationship in the matrix network 160 and are inverted to produce the $G-Y$ component. The signals representing the $R-Y$, $B-Y$ and $G-Y$ components are applied to the grids of the cathode-ray tube 162 in a television receiver 164 and the signal representing the intensity or luminance Y at the emitter follower 108 is delayed by a delay line 105 corresponding to the delay line 91 in FIG. 4 and is applied in delayed form to the cathodes of the television cathode-ray tube. The television receiver 164 then reproduces the color image on the face of the cathode-ray tube in the color television receiver.

The above discussion is based on a reference phase normal to the scan direction. It should be appreciated that this is arbitrary and that other reference phase angles can be used. It is only necessary that the relative phase of the two moduations vary by 180° in two successive scan lines. The trimmer delay 130 can be adjusted accordingly. For example the modulators may have equal angles with opposite slope with respect to the scan, in which case the spatial frequencies are identical.

The discussion above has proceeded on the basis of converting a color image such as a color photograph to a composite image on a black-and-white photograph and then operating upon the composite image to reproduce the color image. It will be appreciated, however, that a live scene may also be scanned by systems within the scope of this invention to produce modulated signals representing the live scene. Such systems use gratings somewhat similar to those shown in FIGS. 3 and 5.

Figure 7:
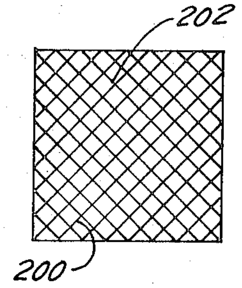
FIG. 7 is an enlarged schematic representation of gratings used to produce individual images representing different colors when a live scene is being scanned.

FIG. 7 illustrates a grating which may be used when live scenes are to be scanned. The grating includes filter lines 200 having a yellow color transmission to pass all signal components in the color image except the color blue. The grating further includes filter lines 202 having a cyan color transmission to pass all signal components in the color image except the color red. The relation disposition of the filter lines 200 and 202 may correspond to the embodiment shown in FIG. 3 when the signals produced by the lines 200 and 202 are to have two different frequencies. The relative disposition of the filter lines 200 and 202 may correspond to the embodiment shown in FIG. 5 when the signals produced by the lines 200 and 202 are to have different phases.

Figure 8:
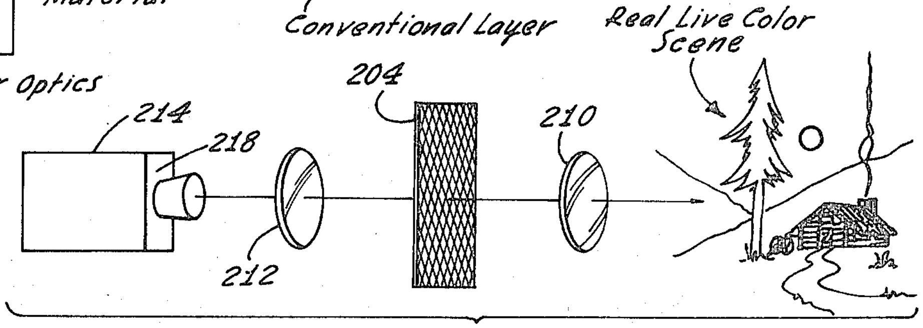
FIG. 8 is a schematic diagram of a system constituting this invention for operating in conjunction with the grating shown in FIG. 7 to produce signals representing the color image.

The grating shown in FIG. 7 is included as a color modulator 204 in the system schematically shown in FIG. 8. This system includes a lens 210 for focusing the image of the live scene on the modulator 204. The image on the modulator 204 is then focused by a lens 212 on a color camera 214.

The signals produced by the tube 214 in the camera may be transmitted to a position removed from the camera. The signals are then processed by a system corresponding to that shown in FIG. 4 or corresponding to that shown in FIG. 6 to reproduce the color image.

Figure 10:
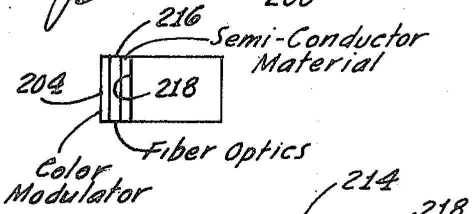
FIG. 10 is an enlarged fragmentary illustration of the tube used in the modification shown in FIG. 9 and further illustrates layers added on the face of the tube to make the tube adaptable to the system shown in FIG. 9.
Figure 9:
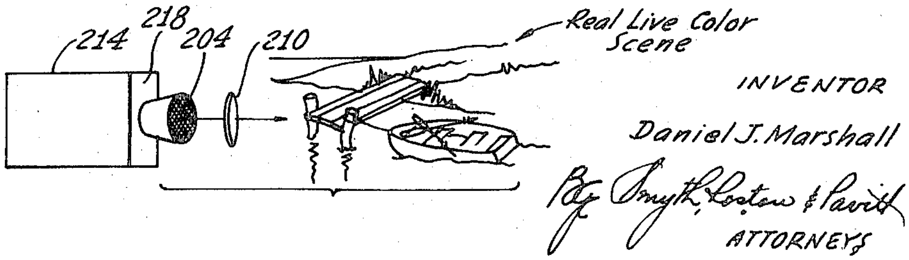
FIG. 9 is a schematic diagram of a modification of the system shown in FIG. 8.

FIGS. 9 and 10 illustrate a modification of the system shown in FIG. 8. In the system of FIGS. 9 and 10, the grating or color modulator 204 of FIG. 8 is disposed in contiguous relationship to the face of the color camera tube 214. A fiber optic faceplate 216 may be required to maintain resolution of the grating on the photosensitive surface of the tube 214. By disposing the color modulator 204 in contact with the fiber optic faceplate, the lens 210 can be eliminated. It will be appreciated that the grating or color modulator 204 can be disposed adjacent the color image instead of imaging a live scene onto the grating as shown in FIGS. 9 and 10.

Figure 11:
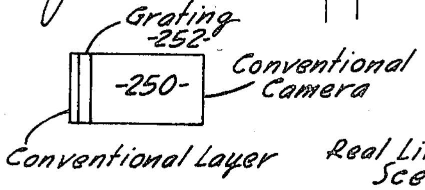
FIG. 11 illustrates a camera modified to take the composite images shown in FIGS. 2 and 7.

In the embodiment shown in FIG. 11, a conventional photographic camera 250 is shown for producing the composite images shown in FIGS. 2 and 7. The camera shown in FIG. 11 has a grating 252 at the film plane corresponding to the grating or modulator 204 shown in FIG. 8. As an alternative, the grating or modulator 252 may be disposed adjacent the color image.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In a system for reproducing a color image from composite signals having signal components formed from spatial modulations of a first color in a first line pattern and spatial modulations of a second color in a second line pattern having a directional orientation different from the first line pattern where the composite signal represents successive line intervals on the composite image and where the signal modulations produced from the modulations of the first color have a first phase relationship in successive lines of scan and where signal modulations of the second color have a second phase relationship different from the first phase relationship in the successive lines of scan;

means responsive to the first phase relationship for operating upon the signals representing the composite image to recover from such signals the signal components having the first phase relationship and representing the first color;

means responsive to the second phase relationship for operating upon the signals representing the composite image to recover from such signals the signal components having the second phase relationship and representing the second color; and means for operating upon the signal components representing the first and second colors to obtain a reproduction of the color image.

2. In the system set forth in claim 1, a composite image being provided on a black-and-white medium with a representation of a first color modulated in the first line pattern and a representation of a second color modulated in the second line pattern and means being provided for scanning the composite image to produce signals representing the composite image.

3. In a system for reproducing a color image from composite signals having signal components formed from spatial modulations of a first color in a first line pattern and spatial modulations of a second color in a second line pattern having a different angular relationship from the first line patterns where the composite signals represent periodic phase relationships between the two modulations in successive pairs of line intervals taken in a direction different from either modulator and where the two modulations have the same frequency in successive pairs of line intervals corresponding to the direction of sweep of a beam;

electronic means responsive to the relative phase of the composite signals representing successive lines of the composite image in the direction of sweep of the beam to recover from such signals the signal component representing the first color;

electronic means responsive to the relative phase of the composite signals representing successive line intervals of the composite image in the direction of sweep of the beam to recover from such signals the signal components representing the second color;

electronic means responsive to the composite signals in the sweep of the beam for producing signals representing the luminance of the color image; and electronic means for operating upon the signals representing the first and second colors and the luminance to obtain a reproduction of the color image.

4. In the system set forth in claim 3, a composite image being provided on a black-and-white medium with a representation of a first color modulated in the first line pattern and a representation of a second color modulated in the second line pattern and means being provided for scanning the composite image to produce signals representing the composite image.

5. In combination in a system for reproducing a color image from a composite image having a first color spatially modulated in a first line pattern and a second color spatially modulated in a second line pattern having a different angular relationship from the first line pattern and having a third color without any modulating line pattern where the composite image is obtained from successive lines of scan on the color image and where the composite signal represents successive line intervals on the composite image and where the signal modulations produced from the modulations of the first color have a first phase relationship in successive lines of scan and where signal modulations of the second color have a second phase relationship different from the first phase relationship in the successive lines of scan;

means for scanning the composite image in the successive lines of scan to produce signals representing the composite image and having signal components modulated in accordance with the first and second line patterns and representing the first and second colors;

means responsive to the signals representing the composite image to produce signal components representing the luminance of the color image;

means responsive to the first phase in the signals representing the composite image to recover the signal components having the first phase relationship and representing the first color;

means responsive to the second phase in the signals representing the composite image to recover the signal components having the second phase relationship and representing the second color;

means responsive to the signal components representing the first and second colors and the luminance to produce signal components representing the third color; and means responsive to the signal components representing the first, second and third colors and the signal components representing the luminance for reproducing the color image.

6. In combination in a system for reproducing a color image from a composite image having a first color spatially modulated in a first line pattern and a second color spatially modulated in a second line pattern having a different angular relationship from the first line pattern and having a third color without any modulating line pattern where the composite image is obtained from successive lines on the color image and where, when scanned, the modulations of the first color in the successive lines of scan have a different phase relationship from the modulations of the second color in the successive lines of scan;

first means for scanning the composite image in the successive lines of scan to produce signals representing the composite image and having signal components modulated in accordance with the first and second line patterns and representing the first and second colors;

second means responsive to the signals representing the composite image to produce signal components representing the luminance of the color image;

third means responsive to the signals representing the composite image for operating upon the modulations in the first line pattern in accordance with the first phase relationship in the successive lines of scan to recover the signal components representing the first color;

fourth means responsive to the signals representing the composite image for operating upon the modulations in the second line pattern in accordance with the second phase relationship in the successive lines of scan to recover the signal components representing the second color;

fifth means responsive to the signal components representing the first and second colors and the luminance to produce signal components representing the third color; and sixth means responsive to the signal components representing the first, second and third colors and the signal components representing the luminance for reproducing the color image.

7. The combination set forth in claim 6 wherein the signal components produced from successive scan lines in the first line pattern are in phase and wherein the signal components produced from successive scan lines in the second line pattern are substantially 180° out of phase relative to the signal components produced from the successive scan lines in the first line pattern and wherein the third means respond to the in-phase characteristics of the signal components produced from the successive scan lines in the first line pattern to produce the signals representing the first color and wherein the fourth means respond to the out-of-phase characteristics of the signal components produced from the successive scan lines in the second line pattern to produce the signals representing the second color.

8. In a method of producing on a black-and-white medium a composite image of a color image, the steps of:

providing spatial modulations in a first particular line pattern and having a first particular frequency and a first phase relationship to represent a first particular color;

providing spatial modulations in a second particular line pattern having a directional orientation different from the first particular line pattern and having the first particular frequency and a second phase relationship different from the first phase relationship to represent a second particular color; and exposing the color image on the black-and-white medium with the first and second spatial modulations.

9. In a method of producing a composite image on a black-and-white medium where the composite image is subsequently scanned in successive lines on the image, the steps of:

providing a first filter having first spatial modulations in a first particular line pattern, the spatial modulations providing a first particular phase relationship and a first particular frequency in the successive scan lines to represent a first particular color;

providing a second filter having second spatial modulations in a second particular line pattern having a directional orientation different from the first particular line pattern, the second spatial modulations providing in successive scan lines the first particular frequency and a second particular phase relationship different from the first particular phase relationship to represent a second particular color; and exposing the color image on the black-and-white medium with the first and second spatial modulations.

10. In the method set forth in claim 9, providing the first spatial modulations to obtain, when scanned, the same phase relationship in the successive scan lines and providing the second spatial modulations to obtain, when scanned, a 180° phase relationship in the successive scan lines relative to the phase relationship of the successive scanned lines in the first spatial modulations.

11. In a method of producing a composite image of a color image, the steps of:

providing a first filter spatially modulated in a first particular line pattern defined by a first particular frequency and a first phase relationship to control the passage of signals representing a first particular color in accordance with the first particular line pattern;

providing a second filter spatially modulated in a second particular line pattern defined by the first particular frequency and a second phase relationship different from the first phase relationship and having a directional orientation different from the first particular line pattern to control the passage of signals representing a second particular color in accordance with the second particular line pattern; and scanning the color image to produce signals representing the color image and respectively modulated by the first and second filters in the first and second line patterns.

12. The method set forth in claim 11 wherein the color image is scanned in successive lines and wherein the first particular line pattern controls the production of signals modulated in a first particular phase relationship in the successive lines and the second particular line pattern controls the production of signals modulated in the successive lines in a second particular phase relationship different by 180° from the first particular phase relationship.

13. A method of producing a composite image of a color image and reproducing the color image from the composite image, including the steps of:

providing first spatial modulations in a first particular line pattern having a first particular frequency and a first particular phase to represent a first particular color;

providing second spatial modulations in a second particular line pattern having a directional orientation different from the first particular line pattern and having the first particular frequency and a second particular phase different from the first particular phase to represent a second particular color;

exposing the color image on a black-and-white medium with the first and second modulations;

scanning the composite image to produce signals representing the composite image and having signal components modulated in accordance with the first and second line patterns and representing the first and second particular colors;

operating from the signals representing the composite image in accordance with the first particular phase to recover the signal components representing the first particular color;

operating upon the signals representing the composite image in accordance with the second particular phase to recover the signal components representing the second particular color;

operating upon the signals representing the composite image to produce signal components representing the luminance of the color image;

operating upon the signal components representing the first and second particular colors and the luminance to produce signal components representing a third particular color of the color image; and operating upon the signal components representing the luminance and the first, second and third particular colors of the color image to reproduce the color image.

14. The method set forth in claim 13 wherein the color image is scanned in successive lines and wherein the first particular line pattern controls the production of signals having an in-phase relationship in the successive lines of scan and the second particular line pattern controls the passage of signals having a 180° out-of-phase relationship in the successive lines of scan relative to the phase of the signals produced by the first particular line pattern.

15. A method of producing a composite image of a color image and reproducing the composite image from the color image, including the steps of:

scanning a color image to produce signals representing the color image;

providing a first filter in a first particular line pattern defined by a first particular frequency and a first phase relationship to control the passage of signals representing a first particular color in accordance with the first particular line pattern; providing a second filter in a second particular line pattern having a directional orientation different from the first particular line pattern and defined by the first particular frequency and a second phase relationship different from the first phase relationship to control the passage of signals representing a second particular color in accordance with the second particular line pattern;

combining the signals representing the first and second particular colors to produce composite signals;

operating upon the composite signals in accordance with the first phase relationship in the first particular line pattern of the first filter to recover the signals representing the first color;

operating upon the composite signals in accordance with the second phase relationship in the second particular line pattern of the second filter to recover the signals representing the second particular color;

operation upon the signals representing the composite image to produce signals representing the luminance of the color image;

operating upon the signals representing the first and second particular colors and the luminance to produce signals representing a third particular color of the color image; and operating upon the signals representing the luminance and the first, second and third particular colors of the color image to reproduce the color image.

16. In a system for producing a color image including a means for providing a sweep of a beam in a particular direction, a grating having a first plurality of equally spaced, substantially parallel lines defined by a first frequency and a first phase relationship in the direction of said beam sweep and spatially modulated in a first line pattern disposed in a first direction relative to the direction of sweep and a plurality of equally spaced, substantially parallel lines defined by the first frequency and a second phase relationship different from the first phase relationship in the direction of said beam sweep and disposed in a second direction different from the first direction, the first plurality of substantially parallel, equally spaced lines having a spacing and disposition relative to the second plurality of substantially parallel, equally spaced lines to provide a common frequency with the second plurality of substantially parallel, equally spaced lines in accordance with the sweep of said beam, the first plurality of substantially parallel, equally spaced lines having a relative disposition to provide a first phase relationship for a the first color in successive lines of scan and the second plurality of substantially parallel, equally spaced lines having a relative disposition to provide a second phase relationship different from the first phase relationship for a the second color in successive lines of scan.

17. In the system set forth in claim 16, the second plurality of lines having a phase relationship different by 180° from a first phase of the first plurality of lines in the successive lines of scan.

18. In the system set forth in claim 17, the distance between successive lines in the first plurality in the direction of the sweep of said beam being substantially the same as the distance between successive lines in the second plurality in the direction of the sweep of the beam.

* * * * *

Notice of Adverse Decision in Interference

In Interference No. 98,334, involving Patent No. 3,647,943, D. J. Marshall, TRANSDUCER SYSTEM AND METHOD, final judgment adverse to the patentee was rendered Apr. 28, 1976, as to claims 1, 2, 3, 4, 8, 9, 11 and 16.

[*Official Gazette November 30, 1976.*]